United States Patent [19]

Munsey

[11] 4,057,836
[45] Nov. 8, 1977

[54] SLOW SCAN TELEVISION SCAN CONVERTER

[75] Inventor: Clarence Jennings Munsey, Lakeside, Calif.

[73] Assignee: Robot Research, Inc., San Diego, Calif.

[21] Appl. No.: 758,019

[22] Filed: Jan. 7, 1977

Related U.S. Application Data

[63] Continuation-in-part of Ser. No. 651,517, Jan. 22, 1976, abandoned which is a continuation of Ser. No. 571,084, April 24, 1975, abandoned.

[51] Int. Cl.² ............................................. H04N 7/12
[52] U.S. Cl. .................... 358/140; 358/134; 358/138
[58] Field of Search ............... 358/140, 134, 85, 138; 179/2 TV

[56] References Cited

U.S. PATENT DOCUMENTS

| | | | |
|---|---|---|---|
| 3,478,164 | 11/1969 | Southworth | 358/140 |
| 3,806,644 | 4/1974 | Browne | 358/140 |
| 3,810,174 | 5/1974 | Heard | 358/140 |
| 3,904,817 | 9/1975 | Hoffman | 358/140 |
| 3,914,543 | 10/1975 | Kawahara | 358/140 |
| 3,941,921 | 3/1976 | Yumde | 358/134 |
| 4,002,827 | 1/1977 | Nevin | 358/140 |

OTHER PUBLICATIONS

QST, G. R. Steber, "SS TV to Fast-Scan Converter, Mar. 1975, pp. 33-40.

QST, G. R. Steber, "Slow-Scan to Fast-Scan TV Converter, May 1975, pp. 28-36, 46.

Primary Examiner—Howard W. Britton
Attorney, Agent, or Firm—Brown & Martin

[57] ABSTRACT

A system for storing video information at both a slow scan rate and a fast scan rate, and for retrieving video information signals from the stored information at both the slow scan rate and the fast scan rate. A random access memory stores information provided by digital video information signals. An address selector addresses a selected location in the memory. A slow scan counter provides a count at the slow scan rate. The slow scan count is provided to the address selector for indicating the selected location to be addressed in the memory when either storing or retrieving information at the slow scan rate. A fast scan counter provides a count at the fast scan rate. The fast scan count is provided to the address selector for indicating the selected location to be addressed in the memory when either storing or retrieving information at the fast scan rate. An address selection control responds to the fast scan counter for causing the address selector to address the selected locations in the memory indicated by the count provided by the fast scan counter during intervals corresponding to one line of video information provided at the fast scan rate, and to address the selected locations in the memory indicated by the count provided by the slow scan counter during blanking intervals between the video line intervals.

10 Claims, 11 Drawing Figures

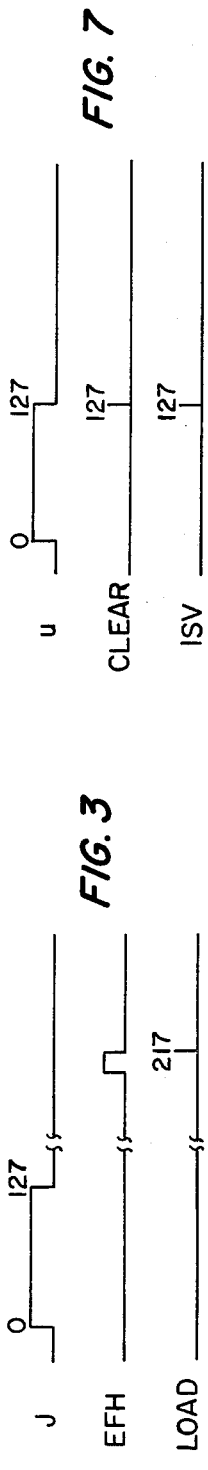
FIG. 2
FIG. 3
FIG. 4
FIG. 5
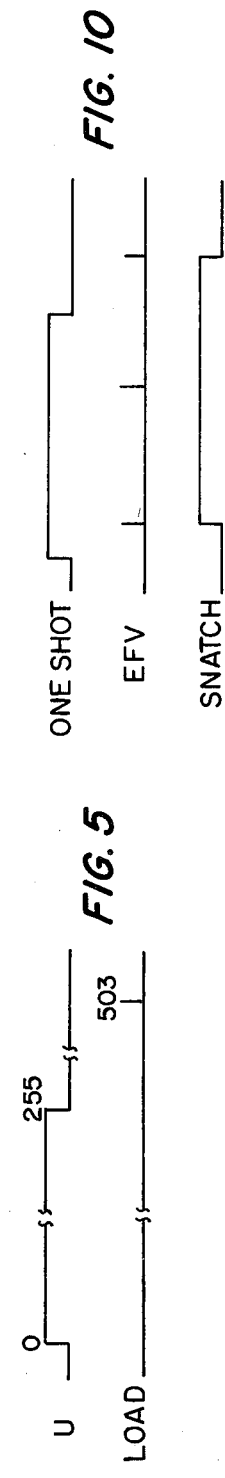
FIG. 6
FIG. 7
FIG. 8
FIG. 10

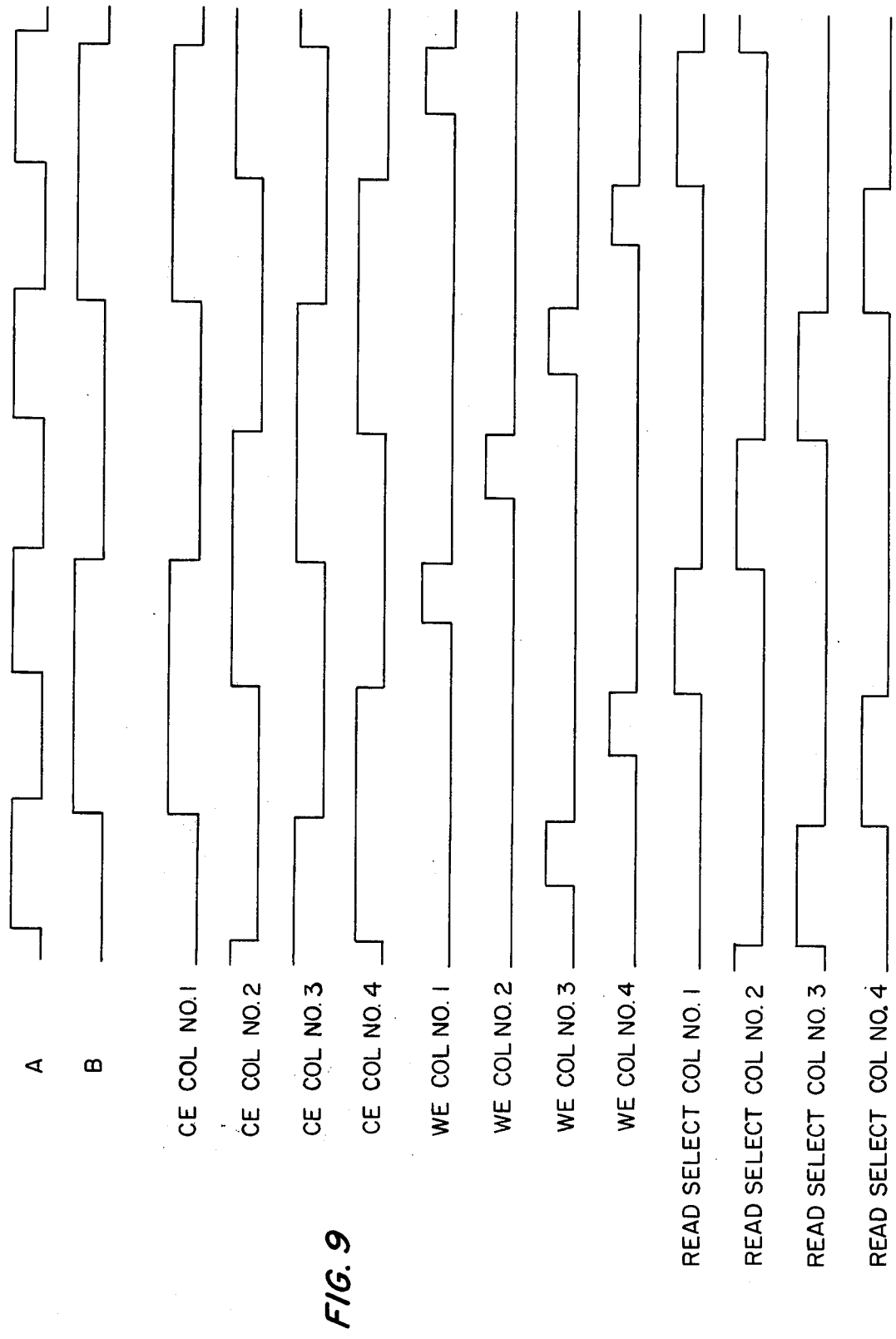

SLOW SCAN TELEVISION SCAN CONVERTER

CROSS REFERENCE TO RELATED APPLICATIONS

This application is a continuation-in-part of application Ser. No. 651,517 now abandoned, filed Jan. 22, 1976 as a continuation of application Ser. No. 571,084, filed Apr. 24, 1975 (now abandoned).

BACKGROUND OF THE INVENTION

The present invention generally pertains to video information signal processing and is particularly directed to storage and retrieval of video information in a slow scan television system.

Slow scan techniques were developed to accommodate high data rate sources to narrow band communication channels. Slow scan techniques have had particular application to the transmission of video information, such as a picture developed as a television type raster scan frame, over voice grade communication channels at a data rate that can be accommodated in the limited bandwidth available. The time necessary to transmit sufficient information for a video presentation of acceptable quality requires on the order of 8 to 32 seconds per frame. Such slow frame rates are incompatible with conventional television monitors because the phosphors utilized on the face of the display tube do not have sufficient persistence to stay illuminated for a full frame.

One type of slow scan television system utilizes a specially designed slow scan display tube incorporating long persistence phosphors. In such a tube, the illumination produced by the electron beam produces an after glow of the long persistence phosphors that permits viewing of a complete frame in relatively low ambient light conditions. The face of the tube is the only storage for the received image and it is therefore necessary to have a continuously repeating image for longer display. On such tubes, the writing line, or bright portion of the tube, makes it difficult to view the remainder of the tube. Further, the 8 second delay in production of a new picture makes it difficult to adjust the system for proper contrast and other picture variables.

The disadvantages associated with the use of long persistence phosphors has led to the development of other slow scan television systems that incorporate storage for a complete frame of video information separate from the display tube. A slow scan image is written into a memory until a completed picture is developed. The completed image may then be retrieved from the memory as many times as is desired at a fast scan rate and displayed on a conventional television monitor. However, such systems are not capable of simultaneously monitoring the stored image and storing/retrieving slow scan information.

Various systems have been proposed incorporating a second memory unit so that fast scan monitoring and simultaneous slow scan read/write functions may be obtained. However, such systems are excessively expensive for many applications and increase the complexity of the system thereby degrading reliability and operational flexibility.

SUMMARY OF THE INVENTION

According to the present invention, there is provided a system for storing video information at both a slow scan rate and a fast scan rate, and for retrieving video information signals from the stored information at both the slow scan rate and the fast scan rate.

The system of the present invention includes a random access memory for storing information provided by digital video information signals; an address selector for addressing a selected location in the memory; a slow scan counter for providing a count at the slow scan rate, wherein the slow scan count is provided to the address selector for indicating a selected location to be addressed in the memory when either storing or retrieving information at the slow scan rate; a fast scan counter for providing a count at the fast scan rate, wherein the fast scan count is provided to the address selector for indicating a selected location to be addressed in the memory when either storing or retrieving information at the fast scan rate; and an address selection control which is responsive to the fast scan counter for causing the address selector to address the selected locations in the memory indicated by the count provided by the fast scan counter during intervals corresponding to one line of video information provided at the fast scan rate, and to address the selected locations in the memory indicated by the count provided by the slow scan counter during blanking intervals between the video line intervals.

Various features of the present invention that are afforded by the preferred embodiment described hereinafter are as follows:

Video information can be received and stored from any standard broadcast television camera, closed circuit television camera, home television camera or video tape recorder. Video information can be retrieved from the memory to produce fast scan video information signals that can be viewed on any standard television monitor, and to produce slow scan video information signals that can be transmitted over narrow band communication channels, and be recorded on any audio tape recorder, cassette or reel. This preferred embodiment can also receive and display any standard slow scan television (SSTV) signal generated by an SSTV sampling camera (non-freeze motion) or a previously recorded SSTV picture played back by any audio tape recorder.

One-field pictures can be snatched from a television camera or other video source either automatically at the beginning of each SSTV picture or upon push-button command, thus "freezing" motion in 1/60 second.

The received video information signal is quantized to 16 gray shades by means of an analog-to-digital converter. The corresponding TV picture can be viewed as so quantized in the same fashion before storage. Upon retrieval from the memory, the signal can be converted by a precision digital-to-analog converter for SSTV transmission of an exact reproduction of the picture viewed on the TV monitor.

The SSTV picture is composed of 128 lines with 128 dots along each line, or 16,384 resolvable picture elements. Total required binary storage is thus $4 \times 16,384$; or 65,536 binary bits. Four dynamic 4K random access memories (RAM's) are used for storage. Thus there are 16 RAM's in the preferred embodiment, each storing 4,096 binary bits. The memory locations in these RAM's are addressed at the fast scan rate to provide the display on the television monitor and to store a field received at the fast scan rate, and also at the slow scan rate so as to correspond to the slower rates of incoming or outgoing SSTV signals.

The preferred embodiment of the present invention in combination with a standard television monitor and a standard television camera, is the only equipment needed to outfit an existing communication link for picture transmission and reception. Addition of SSTV transmission does not disturb the use of the facility for voice communication. However, voice and SSTV signals cannot be transmitted simultaneously over the same channel.

Additional features of the present invention are set forth in the description of the preferred embodiment.

BRIEF DESCRIPTION OF THE DRAWING

FIGS. 2 through 10 are timing diagrams relating to the processing of control signals within the system shown in FIGS. 1A and 1B.

DESCRIPTION OF THE PREFERRED EMBODIMENT

Figure 1A:
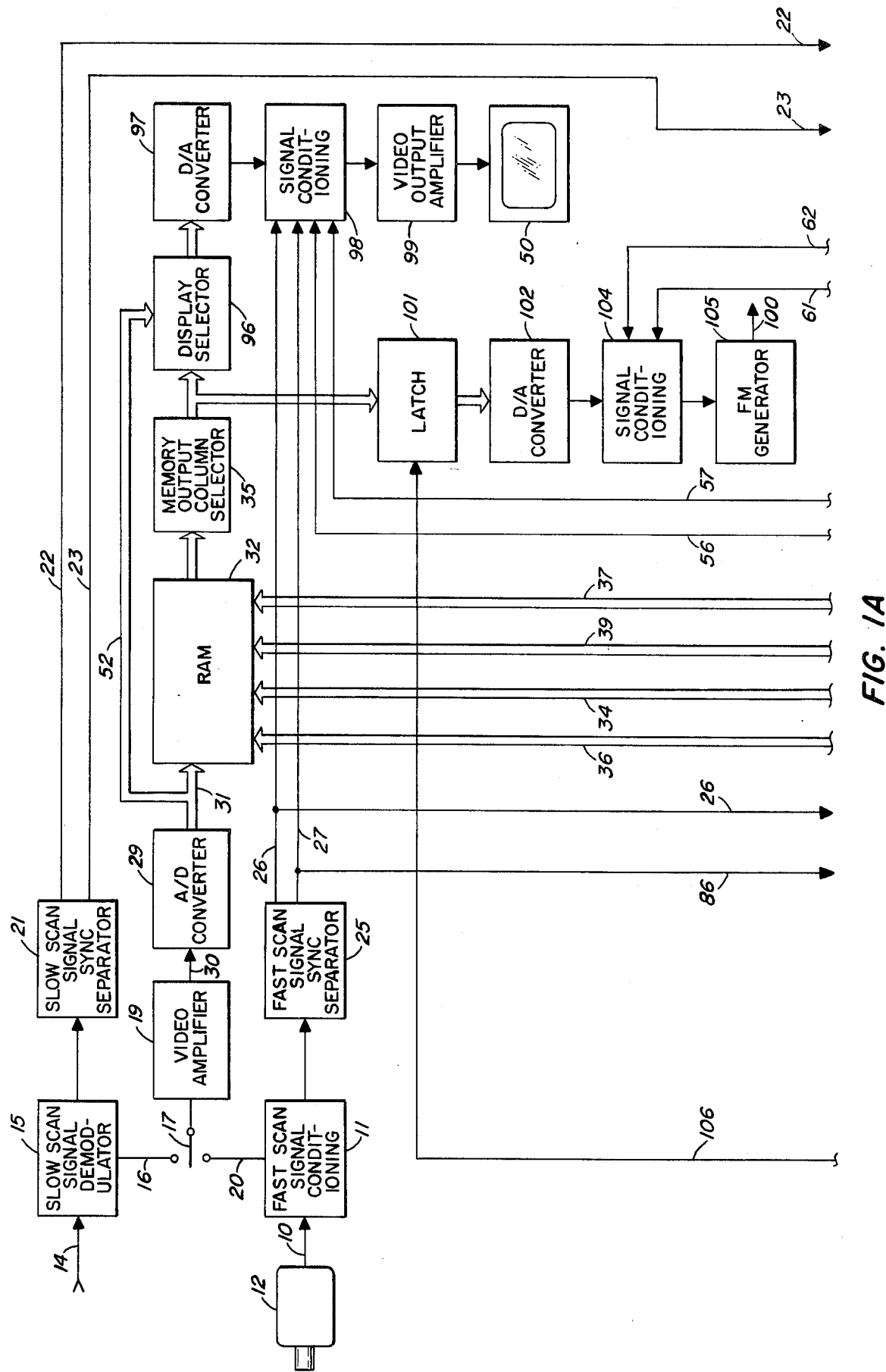
FIGS. 1A and 1B in combination are a schematic block diagram of the system of the present invention.
Figure 1B:
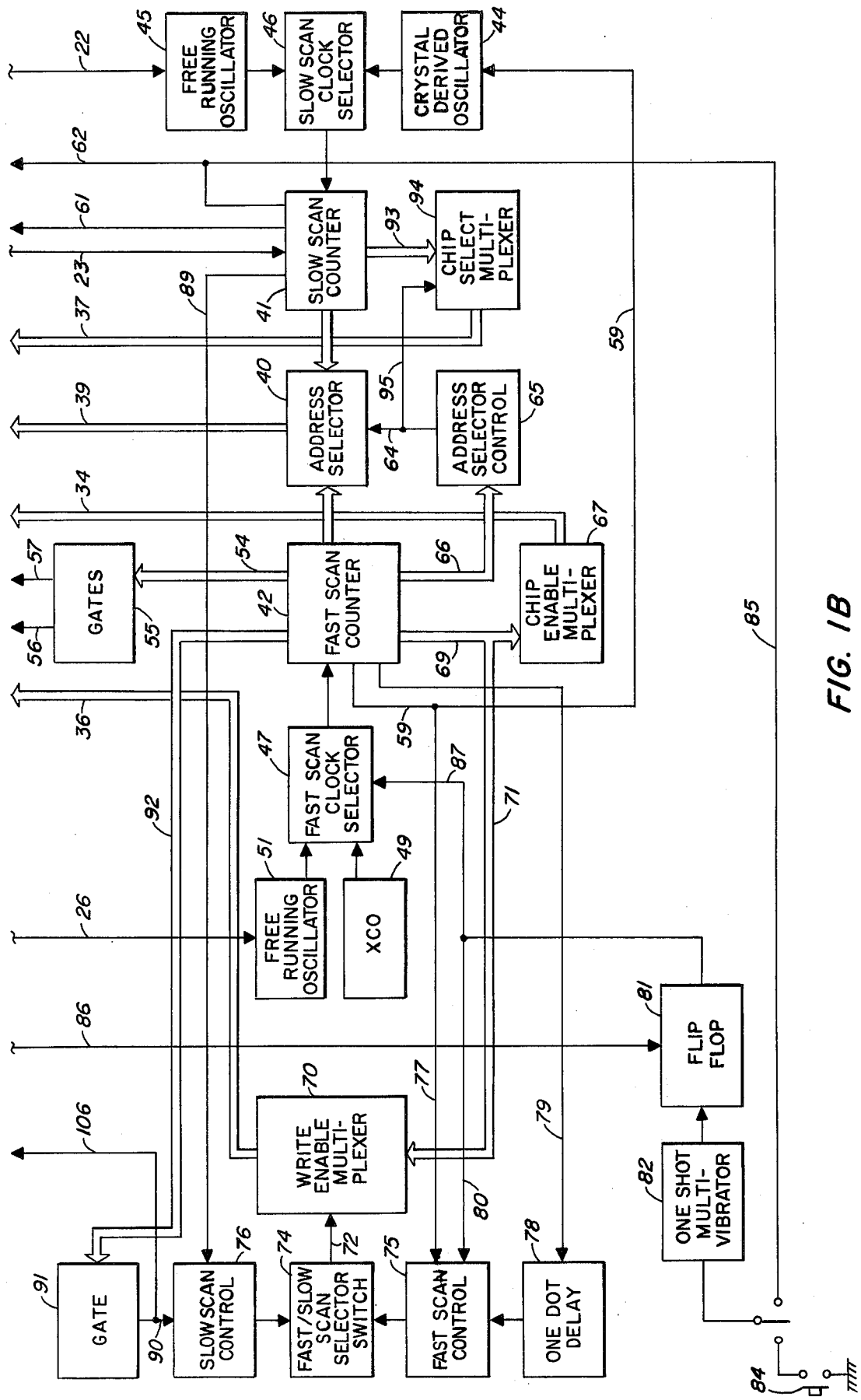

Referring to FIGS. 1A and 1B, a video information signal is received at the fast scan rate on input line 10 by a fast scan signal conditioning circuit 11. The source of the fast scan signal on line 10 may be such as a standard television camera 12 or a video tape recorder. The fast scan signal conditioning circuit 11 includes controls for adjusting the contrast and brightness of the fast scan signal received on line 10.

A frequency modulated video information signal is received at the slow scan rate on input line 14 by a slow scan signal demodulator circuit 15. The source of the slow scan signal received on line 14 is a device having a narrow band communication channel, such as a telephone line, an audio tape recorder, or a SSTV sampling camera. The slow scan signal demodulator circuit 15 includes controls for adjusting the contrast and brightness of the slow scan signal received on line 14. The demodulator circuit 15 also converts the frequency modulated video information signal on line 14 to a variable amplitude video information signal which is provided on line 16.

A selector switch 17 connected to the input of a video amplifier 19 allows the video amplifier to be selectively connected to either an output line 20 of the fast scan signal conditioning circuit 11 or the output line 16 of the slow scan signal demodulator circuit 15. The video amplifier 19 conditions the received video information signal from either the slow scan signal demodulator circuit 15 or the fast scan signal conditioning circuit 11 to lie within a predetermined voltage range, such as from 0 to 4 volts.

A slow scan signal sync separator circuit 21 connected to the slow scan signal demodulator circuit 15 separates slow scan vertical and horizontal sync signals from the slow scan video information signal received on line 14 and provides a signal representing the slow scan horizontal sync pulses on line 22, which signal is hereinafter referred to as ESH (for external slow scan horizontal sync). The slow scan signal sync separator circuit 21 also provides a signal representing the slow scan vertical sync pulses on line 23, which signal is hereinafter referred to as ESV.

A fast scan signal sync separator circuit 25 connected to the fast scan signal conditioning circuit 11 separates fast scan vertical and horizontal sync signals from the fast scan video information signal received on line 10 and provides a signal representing the fast scan horizontal sync pulses on line 26 (hereinafter referred to as EFH) and a signal representing the fast scan vertical sync pulses on line 27 (hereinafter referred to as EFV).

An analog-to-digital converter 29 receives the output signal on line 30 from the video amplifier 19 and converts the analog input signal on line 30 into an equivalent 4 bit binary digital video information signal on four lines 31. A 4 bit word can represent a maximum of 16 different amplitudes. The analog-to-digital converter 29 includes a voltage divider (not shown) with 16 equally spaced taps for establishing the 16 different amplitudes. Each tap is connected to a comparator that signals at its output whether the received video signal on line 30 has an amplitude greater or less than the value of that tap. All of the comparator outputs are combined together in logic gates to form the 4 bit word.

The following table lists the code words used to represent various shades of gray in the picture.

| SHADE | GRAY CODE | BINARY CODE |
|---|---|---|
| WHITE | 0000 | 0000 |
|  | 0001 | 0001 |
|  | 0011 | 0010 |
|  | 0010 | 0011 |
|  | 0110 | 0100 |
|  | 0111 | 0101 |
|  | 0101 | 0110 |
|  | 0100 | 0111 |
|  | 1100 | 1000 |
|  | 1101 | 1001 |
|  | 1111 | 1010 |
|  | 1110 | 1011 |
|  | 1010 | 1100 |
|  | 1011 | 1101 |
|  | 1001 | 1110 |
| BLACK | 1000 | 1111 |

The column labeled Gray Code describes the output from the analog-to-digital converter 29. The word Gray, used to describe this code, refers to a man's name. It is a coincidence that the Gray code is used to represent gray shades. The Gray code has the useful property that only one bit changes when moving from a given code to the one above or below. For example, compare the codes in the Binary Code column to the codes in the Gray column. Binary codes often change several bits to represent the next value in a sequence. This is important because a one bit mistake causes a next value error in the Gray code and a very large error in the Binary code. For example, in the Binary Code column note that black is 1111 and middle gray is 0111. A mistake in a single bit causes a resultant error of half of the full signal range. A similar mistake in the Gray Code would result in a one step error. Single bit errors are common because the video signal often has a value such that noise on the signal may cause one of the comparators to constantly change state.

The preferred embodiment is designed to process standard fast scan video signals having a line rate of 15,750 per second and a pix rate of 60 fields per second (each field having 256 lines); and slow scan video signals having a line rate of 15 lines per second and a pix rate of one field per eight seconds (each field having 128 lines).

The digital video information signal on lines 31 is stored in a random access memory (RAM) 32. A RAM 32 allows any memory location to be addressed at any time so as to provide for time interlaced access to the memory at both the slow scan rate and the fast scan rate.

The RAM 32 is made of semiconductor integrated circuit memory chips, such as are used to implement the memory in a digital computer. Each memory chip contains 4096 individual storage cells. Each cell is able to store a 1 or 0 (on or off) in the form of charge on a capacitor. The storage charge gradually leaks from the capacitor. Thus long time storage requires that the memory be refreshed periodically. Refreshing is accomplished by rewriting the charge before it leaks down to an unuseable level.

The memory is arranged so that it is refreshed by reading from it. In the preferred embodiment the memory addressing scheme has been chosen such that reading for fast scan display performs a very conservative refresh. Therefore, no special refresh circuitry for the memory is required. Storage will continue as long as power is applied to the system. When power is interrupted and restored the memory comes on with a random pattern stored.

A complete picture stored in the RAM 32 is 128 pixels (picture elements) wide and 128 lines high. Each pixel contains 4 bits (binary digits). There is one memory location for each pixel. Memory capacity is therefore 128 × 128 × 4 or 65,536 bits. Each chip contains 4096 bits and there are a total of 16 chips.

A semiconductor integrated circuit memory chip can not be operated fast enough to provide a standard television display. The preferred embodiment overcomes this limitation by multiplexing the chips. Multiplexing, in this application, means overlapping memory cycles such that the total operation is faster than the operation of a single chip.

The memory is organized into four columns of four chips each. Multiplexing occurs along each row. The chips of column 1 are read for written), followed (or an overlapping read of column 2, then 3 and 4, and again back to column 1. Each row contains all of the memory for one of the bit positions in the 4 bit word. Each memory location includes the 4 bits stored in corresponding addresses in the four chips of a column. A 4 bit code word is stored in each memory location.

The memory is organized such that the least significant bit in the digital information signal received on lines 31 is stored in the first row of chips. Higher order bits are stored in succeeding rows in the same order as they occur in the code word. The memory is multiplexed to increase its speed by operating the chips in an overlapping fashion so that the active chips shift from column to column as the picture goes from dot to dot. Memory shifting is ordered by a chip enable (CE) signal on four lines 34, which is discussed later.

As the memory shifts it is necessary to switch the chip outputs from column to column. This is accomplished by a memory output column selector switch 35, which includes two double pole, 4 throw multiplex switches.

Input signals to the RAM 32 are connected in parallel to each chip in any given row.

Memory control signals include the (CE) signal on lines 34, a write enable (WE) signal on four lines 36, and a chip select (CS) signal on four lines 37. The CE signal is the signal which clocks the chips. All timing internal to each chip is derived from the CE signal. The WE signal simply controls whether the chip is reading or writing. The CS signal allows a chip to be disconnected from its input and output terminal. The chip is alive in both states of CS, there just is no reaction to input and output signals when it is disconnected.

In the preferred embodiment, the CE signal provides the memory clock pulse and the source of fast scan memory multiplexing. The CS signal is used for slow scan memory multiplexing.

Selected memory locations in the RAM 32 are addressed in accordance with an address signal provided on the twelve lines 39 to the RAM 32 from an address selector 40. The addresses are selected from either a slow scan counter 41 or a fast scan counter 42. The slow scan counter 41 provides a count at a slow scan rate. The slow scan count is provided to the address selector 40 for indicating a selected location to be addressed in the RAM 32 when either storing or retrieving information at the slow scan rate. The fast scan counter 42 provides a count at the fast scan rate. The fast scan count is provided to the address selector 40 for indicating a selected location to be addressed in the RAM 32 when either storing or retrieving information at the fast scan rate.

The clock pulses for the slow scan counter 41 are provided by either a crystal derived ocillator 44 or a free running oscillator 45 which is synchronized by the ESH signal on line 22. A slow scan clock selector 46 provides the slow scan counter 41 with clock pulse signals from the crystal derived oscillator 44 when the system is being used to retrieve information signals from the RAM 32 in order to produce a slow scan video signal for transmission. This is referred to hereinafter as the memory display mode. The selector 46 provides the slow scan counter 41 with clock pulse signals from the free running oscillator 45 when the system is being used to store video information in the RAM 32 from slow scan video information signals received on line 14. This is referred to hereinafter as the camera display mode.

A fast scan clock selector 47 provides the fast scan counter 42 with clock pulse signals either from a crystal controlled oscillator 49 or from a free running oscillator 51. Clock pulse signals are provided from the crystal controlled oscillator 49 when the system is being used to retrieve video information from the RAM 32 in order to produce a fast scan video signal for display on a monitor 50. This occurs during the memory display mode. Clock pulse signals are provided from the free running oscillator 51 when the system is being used to store video information in the RAM 32 from fast scan video signals received on line 10 or when the video signal displayed on the monitor 50 is derived from the camera 12 via the analog-to-digital converter 29 and lines 52 rather than from the RAM 32. This occurs during the camera display mode. The free running oscillator 51 is synchronized by the EFH signal on line 26.

Both the crystal controlled oscillator 49 and the free running oscillator 51 operate at 6.791 mhz which is twice the frequency of the system clock. The fast scan clock selector 47 includes a flip-flop which divides whichever oscillator output that is selected by two in order to obtain a symmetrical clock pulse waveform.

The fast scan counter 42 and the slow scan counter 41 each include four identical semiconductor integrated circuit chips. Each chip is a 4 stage binary counter. Both the clear and load operations of such binary counters are synchronous in that they occur only on the positive going edge of a clock pulse. When either the load or clear input to such a binary counter is taken low, the binary counter stops in its current state. When a clock pulse occurs while the load or clear input is still low, the binary counter will load or clear.

The fast scan counter 42 includes eight stages for counting dots or pixels, and nine stages for counting lines.

The dot counter is analogous to the horizontal sweep in the camera 12 and display monitor 50. The two chips of the dot counter are interconnected so that both chips operate synchronously in that the outputs from the eight stages may change in synchronization with each other FIG. 2 is a timing diagram showing the operation of the fast scan dot counter in the memory display mode. The waveform designated as "J" is the output waveform of the eighth stage of the fast scan dot counter. The numbers shown on the waveforms represents the number of clock pulses received by the fast scan counter 42 from the fast clock selector 47. The width of the video display on the monitor 50 is from counts 0 to 127 while the J waveform is true. A clear pulse is provided at a count of 215. Therefore the fast scan dot counter advances to a count of 215 and then returns to 0 to start counting again. The clock frequency divided by 216(0 to 215 is 216 counts) provides the television horizontal sync frequency. Signals are provided on lines 54 to gates 55, which in turn provide an internal fast scan horizontal sync pulse signal IFH on line 56 at the horizontal sync frequency between counts 160 and 176. The load function of the binary counters is inactive in the memory display mode.

FIG. 3 is a timing diagram showing these operation of the fast scan dot counter in the camera display mode. As in the memory display mode the video display on the monitor is provided from counts 0 to 127. The fast scan dot counter advances until a horizontal sync pulse from the camera 12 appears on line 26 (EFH). The fast scan dot counter is then preset to a count of 217 as indicated by the load waveform. When the fast scan dot counter reaches its maximum count of 255, it starts over at 0 and begins a new cycle. The inverval between 217 and 255 is the left hand edge blanking interval for the display monitor 50, and the interval from 128 until the EFH pulse occurs is the right hand edge blanking interval.

The fast scan line counter includes a flip-flop which receives the J waveform signal from the eighth stage of the fast scan dot counter and eight additional binary counter stages which are fed from this particular flip-flop. Thus the line counter advances one step for each video field line of dots counted by the fast scan dot counter.

FIG. 4 is a timing diagram showing the operation of the fast scan line counter in the memory display mode. The waveform designated as "U" is the output waveform of the ninth stage of the fast scan line counter. This counter advances to a count of 262, is cleared, and starts again at 0. The height of the video display on the monitor 50 is from counts 0 to 255 while the U waveform is true. Signals are provided on lines 54 to gates 55 which in turn provide an internal fast scan vertical sync pulse signal IFV on line 57 at a vertical sync frequency of 262 lines per field between counts 252 and 255. The load function in the binary counters is inactive in the memory display mode.

FIG. 5 is a timing diagram showing the operation of the fast scan line counter in the camera display mode. In the camera display mode the clear function is disabled and the fast scan line counter is preset to a count of 503 when a vertical sync pulse (EFV) from the camera 12 appears on line 27. When the fast scan line counter is preset and the camera vertical sync pulse EFV is completed, the fast scan line counter commences to count from 503 to 511. When the count reaches 511 the next count is 0 whereupon the cycle is repeated. The interval from 503 to 0 allows camera blanking to be completed before the next video field is displayed.

The fast scan line counter advances two counts during each slow scan line interval in order to provide line doubling which produces a more pleasing display. There are 128 slow scan lines. Thus 256 fast scan lines must be provided. Although a standard 525 line television field has 262 lines per field, approximately 20 of these lines may be blanked, thereby leaving about 242 active lines, thereby leaving a shortage of about 14 lines. This shortage may be accommodated by recording some of the camera frame blanking at the top of the picture and by substituting gray scale for missing picture at the bottom.

Referring to the crystal derived oscillator 44 for providing clock pulses to the slow scan counter 41, crystal derived clock signals are provided to the oscillator 44 on line 59 from the ninth state of the fast scan line counter. This is the signal having the U waveform shown in FIG. 4. The frequency of the U waveform signal on line 59 is 60 Hz. In the crystal derived oscillator 44, the 60 Hz pulses are divided by four. The resultant 15 Hz output is provided at one input to a phase-locked oscillator. The other input to the phase locked oscillator is the output of the oscillator divided by 139. The phase-locked oscillator frequency is 15 times 139 or 2085 Hz. This is the frequency at which the slow scan clock signals are provided to the slow scan counter 41 by the crystal derived oscillator 44. This clock rate allows for 128 pixels and 11 sync counts per slow scan line.

The frequency of the free running oscillator 45 may be adjusted. As this frequency is increased, the slow scan counter 41 takes less time to address 128 memory locations and a shorter appearing line is displayed. Synchronization with the SSTV signal received on line 14 is achieved by means of the external slow scan horizontal sync pulse ESH received on line 22, thereby causing the free running oscillator 45 to stop and restart in a consistent phase.

The slow scan dot counter and slow scan line counter each include eight binary divider stages.

The slow scan dot counter has two modes of operation, one to store video information signals in the RAM 32 at the slow scan rate, (the camera mode) and one to retrieve video information signals from the RAM 32 at the slow scan rate (the memory display mode).

FIG. 6 is a timing diagram showing the operation of the slow scan dot counter in the memory display mode. The waveform designated as "j" is the output waveform of the eighth stage of the slow scan dot counter. The memory locations in the RAM are addressed while the "j" waveform is true, that is from count 0 to count 127. The slow scan dot counter is cleared at a count of 139, thereby providing 128 counts for addressing memory locations and 11 counts for providing an internal slow scan horizontal sync pulse ISH on line 61. The load input to the binary counters is held inactive.

When the slow scan dot counter is in the "camera" mode for storing video information received on line 14, the clear pulse signal to the binary counters is derived from an RS flip-flop, which is set by the incoming horizontal sync pulse signal ESH on line 22. The RS flip-flop is reset by the clock pulse signal from the free running oscillator 45. This detail is provided to insure that a clock pulse occurs to clear the slow scan dot counter while the clear input is low (or false). The slow scan sync pulse ESH is allowed to reset the slow scan dot counter only after 128 counts in order to provide noise immunity so that false sync pulses cannot interrupt a line as it is being written.

FIG. 7 is a timing diagram showing the operation of the slow scan line counter in the memory display mode. This counter advances one step for each video field line of dots counted by the slow scan dot counter. The waveform designated as "u" is the output of the eighth stage of the slow scan line counter. This counter advances to a count of 127, is cleared and starts again at 0. An internal slow scan vertical synchronization pulse signal ISV is provided on line 62 at the count of 127.

In the "camera" mode, the slow scan line counter is cleared by setting an RS flip-flop with the ESV signal from line 23. This flip-flop is reset by an internal signal generated when the counter is cleared.

The address lines 39 of the RAM 32 are driven by the fast scan counter 42 and also by the slow scan counter 41. The address lines 39 of the RAM 32 are connected to the correct counter at the proper time by the address selector 40. The address selector 40 is a multiplexer.

The address selector 40 is controlled by a signal on line 64 from an address selection control 65. The address selection control signal is designated as "Z" in FIG. 8. The address selection control is connected to the fast scan dot counter by the lines 66. FIG. 8 further includes the J waveform (also shown in FIG. 2) so as to show its relation to the Z waveform. The address selector 40 connects the slow scan counter 41 to the address lines 39 of the RAM 32 when the Z waveform signal is true; that is during a predetermined interval from counts 128 to 143. This is during a blanking interval following the right hand edge of the fast scan picture. When the Z waveform signal is not true, the address selector connects the fast scan counter 42 to the address lines 39 of the RAM 32. The slow scan counter 41 is inhibited from changing its state when the Z waveform signal goes true.

As mentioned hereinabove, access to the different chips in the RAM 32 for either storing or retrieving information is also controlled by the multiplexed signals CE received on lines 34, WE received on lines 36 and CS received on lines 37.

The CE signals on lines 34 are received from a "chip enable" multiplexer 67. CE pulse signals are used to clock the four memory chip columns. The chip enable multiplexer forms the CE pulse signals in response to the two lowest order bits A and B from the first two states of the fast scan dot counter on lines 69. The relationship between the CE signals to the four chip columns and the timing signals having waveforms designated as "A" and "B" is shown in the timing diagram of FIG. 9. Note that the CE signals to the successive columns of memory chips are overlapped by 50% so as to obtain the addressing speed required for the video display on the monitor 50. The CE signals are formed by a delay flip-flop using the B waveform signal as a data input signal and the A waveform signal (which is slightly delayed) as the clock input signal. The A waveform signal is delayed by an RC circuit feeding a Schmidt trigger so as to insure that the memory address lines are stable before the CE signal goes high.

The WE signals on lines 36 are derived from a "write" multiplexer 70. The write multiplexer 70 also responds to the A and B waveform signals which are provided on lines 71 from the first two stages of the fast scan dot counter. The WE signals to the memory chips are multiplexed so that a chip will have coincident WE and CE inputs. The WE signals are active for only one chip column at a time in response to the A and B waveform signals.

A signal on a control line 72 determines when writing is to take place. The control line 72 is connected through a manual selector switch 74 to either a fast scan control 75 or a slow scan control 76.

The fast scan control 75 provides an enabling control signal to the write multiplexer 70 only during such times as the U waveform signal received on lines 77 from the fast scan line counter is true and an unblanking signal (IFHB) received from a one-dot delay circuit 78 in response the J waveform signal on line 79 from the fast scan dot counter is also true. The IFHB signal is also applied to unblank the monitor display in all modes.

The fast scan control 75 is further enabled in response to a SNATCH signal on line 80 from a snatch control circuit. The snatch control circuit includes a flip-flop 81 and a one-shot multivibrator 82. The snatch control circuit times the storage of video information into the RAM at the fast scan rate. An input signal to the one shot multivibrator 82 is received in the "hold" mode when the push button switch 84 is closed to seize video information from the camera 14. An input signal to the one shot multivibrator 82 is received in the "continue" mode when an internal slow scan vertical sync pulse ISV is received on line 85 from the slow scan counter 41. In the "continue" mode new video information is written in the RAM 32 upon the completion of each video field at the slow scan rate. In the "hold" mode the same video information is continuously rewritten into the RAM 32.

A timing diagram for the snatch control circuit appears in FIG. 10. It is seen that the flip-flop 81 is not enabled by the one shot multivibrator 82 until an external fast scan vertical sync pulse EPV has been received on line 86. The duration of the signal from the one shot multivibrator is between two and three video fields at the fast scan rate. Accordingly the fast scan control is synchronized to enable the write multiplexer to begin storing video information in the RAM 32 only at the beginning of a video field of video information being received at the fast scan rate.

The output from the flip-flop 81 is also provided on line 87 to the fast scan clock selector 47 so as to control which oscillator 49 or 51 is selected to clock the fast scan counter 42. The free running oscillator 51 is selected when the SNATCH signal on line 87 is true.

The slow scan control 76 provides an enabling control signal to the write multiplexer 70 only during such times as the j waveform signal received on line 89 is true and the slow scan memory enable signal (SSME) received on line 90 is also true. The timing of the SSME signal is shown in FIG. 8. The SSME signal is provided from a gate 91 in response to signals received from the fast scan dot counter on lines 92. The SSME signal is true for a given interval of four consecutive fast scan dot counts which begins after and terminates before the beginning and termination of the Z intervals.

The CS signals on lines 37 are provided from a "chip select" multiplexer 94. The chip selector multiplexer responds to the output signals on lines 93 from the first two stages of the slow scan dot counter. The four output lines 37 from the chip select multiplexer 94 all provide a true CS signal at all times except when the Z waveform signal (FIG. 8) received from the address selector 65 on line 95 is true. Then only the line 37 determined by the two lowest order output signals from the first two stages of the slow scan dot counter provides a true CS signal.

Referring to FIG. 8, it is noted that the SSME signal is true within the interval that the Z waveform signal is also true. The SSME signal true interval is four dots long, which is long enough to address all four chip columns in the RAM 32 one time. Thus, whichever one of the chip columns that is enabled for selection by a true CS signal during the Z true interval will be addressed for storage of video information during the coincident Z and SSME true interval, provided of course that the system is placed in a mode for writing video information in the RAM 32 at the slow scan rate. The SSME true interval begins after the beginning of the Z true interval to allow time for any transients created by the address switchover from fast scan to slow scan to have died out before an information sample is taken.

The memory output column selector 35 switch also is a multiplexer. The timing for the memory output columns selector 35 is shown by the "read select" waveforms in the timing diagram of FIG. 9.

A display selector 96 determines whether the video display on the monitor 50 is derived from the RAM 32 or from the camera 12 via the analog-to-digital converter 29 and lines 52. Whichever signal is selected by the display selector 96 is provided to a digital-to-analog converter 97, from where it is processed through a signal conditioning circuit 98 to a video output amplifier 99. Any standard fast scan television monitor 50 may be connected to the video output amplifier 99. It is necessary to convert the digital signal retrieved from the RAM 32 from Gray Code to Binary Code before conversion to an analog signal.

The signal conditioning circuit 98 provides for insertion of horizontal and vertical sync signals, either from the fast scan sync separator 25 via lines 26 and 27 when the system is in the camera display mode, or from the gates 55 via lines 56 and 57 when the system is in the memory display mode.

Video information retrieved from the RAM 32 at the slow scan rate for transmission as a SSTV signal is provided at an output terminal 100. The SSTV signal is derived information retrieved from the RAM 32 via a latch circuit 101, by a digital-to-analog converter 102, a signal conditioning circuit 104 and an FM generator 105.

The latch circuit 101 stores the retrieved information between the times that information is being read from the RAM 32. The latch circuit is enabled to receive information from the RAM 32 during the true interval of the SSME signal received on line 106 from gate 91. The digital-to-analog converter 102 converts the digital signal from Gray code to Binary Code and then to an analog signal.

Slow scan internal horizontal and vertical sync signals ISH and ISV on lines 61 and 62 from the slow scan counter 41 are inserted into this analog signal by the signal conditioning circuit 104.

The SSTV signal for transmission is provided from the conditioned analog signal by the FM generator 105. The FM generator includes a triangle wave generator in the FM oscillator because a triangle waveform is acceptable to both tape recorders and radio transmitters.

Having described my invention, I now claim:

1. A system for storing video information at both a slow scan rate and a fast scan rate, and for retrieving video information signals from said stored information at both the slow scan rate and the fast scan rate, comprising:
   a random access memory for storing information provided by digital video information signals;
   an addressing means for addressing a selected location in the memory;
   slow scan counting means for providing a count at the slow scan rate, wherein said slow scan count is provided to the addressing means for indicating a said selected location to be addressed in the memory when either storing or retrieving information at the slow scan rate;
   fast scan counting means for providing a count at the fast scan rate, wherein said fast scan count is provided to the addressing means for indicating a said selected location to be addressed in the memory when either storing or retrieving information at the fast scan rate; and
   address selection control means responsive to the fast scan counting means for causing the addressing means to address said selected locations in the memory indicated by the count provided by the fast scan counting means during intervals corresponding to one line of video information provided at the fast scan rate, and to address said selected locations in the memory indicated by the count provided by the slow scan counting means during blanking intervals between said video line intervals.

2. A system according to claim 1, wherein the random access memory comprises a plurality of semiconductor integrated circuit memory chips arranged in a given number of columns and rows, with each memory location being contained in a single column.

3. A system according to claim 2, further comprising:
   first multiplexing means for enabling different chip columns to be addressed in an overlapped sequence at the fast scan rate.

4. A system according to claim 3, further comprising:
   second multiplexing means for selecting different chip columns to be addressed during said blanking intervals at the slow scan rate such that only a single chip column is selected during a single blanking interval and the same chip is selected during a plurality of successive blanking intervals.

5. A system according to claim 4, wherein the second multiplexing means select said column for only a predetermined interval within said blanking interval.

6. A system according to claim 5, further comprising;
   third multiplexing means for enabling information to be stored at the fast scan rate in a non overlapping sequence in said different chips that are enabled by the first multiplexing means.

7. A system according to claim 6, further comprising;
   fast scan control means for controlling the third multiplexing means to enable information to be stored at the fast scan rate during said video line intervals;
   slow scan control means for controlling the third multiplexing means to enable information to be stored at the slow scan rate during a given interval beginning after and terminating before the beginning and termination of the predetermined interval, wherein the duration of the given interval is sufficiently long to enable each of the chips to be enabled by the first and third multiplexing means at the fast scan rate; and selection means for causing the fast scan control means to control the third multiplexing means when storing information at the fast scan rate, and for causing the slow scan control means to control the third multiplexing means when storing information at the slow scan rate.

8. A system according to claim 7, further comprising;

fourth multiplexing means for enabling information to be retrieved from the different chips in a non-overlapping sequence at the fast scan rate.

9. A system according to claim 8, further comprising;

latching means connected to the fourth multiplexing means for latching information retrieved from said selected chip column during said given intervals at the slow scan rate.

10. A system according to claim 9, further comprising;

circuit means connected to the fast scan control means for enabling a new field of video information to be stored in the random access memory at the fast scan rate whenever a complete field of retrieved video information has been latched by the latching means at the slow scan rate.

* * * * *